United States Patent [19]

Coleman

[11] Patent Number: 4,807,813
[45] Date of Patent: Feb. 28, 1989

[54] BICYCLE MOUNTED WATER TOY

[76] Inventor: Larry Coleman, 2801 S. Dort Highway, Flint, Mich. 48507

[21] Appl. No.: 111,343

[22] Filed: Oct. 22, 1987

[51] Int. Cl.⁴ .............. B05B 9/08; B62J 39/00
[52] U.S. Cl. .................... 239/153; 239/157; 239/289; 239/302; 239/379; 222/175; 222/614; 280/288.4
[58] Field of Search .............. 239/152, 153, 157, 211, 239/289, 302, 379; 222/78, 79, 621, 175, 614, 617, 620, 623; 280/289 R, 289 H

[56] References Cited

U.S. PATENT DOCUMENTS

| 3,352,364 | 11/1967 | De Coste | 239/152 X |
| 3,677,446 | 7/1972 | Guyer, Jr. et al. | 222/621 X |
| 4,103,924 | 8/1978 | Suhm | 280/289 R |
| 4,150,681 | 4/1979 | Howarth, Jr. | 280/289 R X |
| 4,157,075 | 6/1979 | Kirvutza | 280/289 R X |
| 4,296,875 | 10/1981 | Borglum | 239/157 X |

OTHER PUBLICATIONS

*People Magazine*, 5/1985, p. 111.

Primary Examiner—Douglas C. Butler
Assistant Examiner—Mary Beth O. Jones
Attorney, Agent, or Firm—Basile and Hanlon

[57] ABSTRACT

An amusement device adapted to be mounted to a bicycle or other velocipede designed to promote enjoyment and safty. The amusement device has a fluid reservoir, a pump driven by the velocipede wheel for removing fluid from the reservoir, a conduit for conveying water from the pump to an exit nozzle and a helmet adapted to be worn by the rider of the velocipede to which the nozzle can be attached.

12 Claims, 2 Drawing Sheets

BICYCLE MOUNTED WATER TOY

BACKGROUND OF THE INVENTION

I. Field of the Invention

The present invention is directed toward an amusement device which can be mounted and powered by a bicycle or similar velocipede. More particularly, this invention is directed to a squirt gun or water pistol which is mounted to the velocipede and powered by the same with a helmet mounted nozzle associated with the same.

II. Description of the Prior Art

Various devices have been proposed for use in augmenting bicycles and other velocipede. These devices include safety devices such as that found in U.S. Pat. No. 4,157,075 to Kirvutza and U.S. Pat. No. 4,103,924 to Suhm. These safety devices are reflectors or signaling devices to permit drivers to more readily locate bicyclists.

It is well known that the use of helmets and other protective devices for the face and head significantly reduce the number and severity of bicycle-related accidents. Heretofore, while several different helmet configurations have been proposed, no devices have been developed which would encourage children and young bicycle users to wear safety helmets.

Additionally, there has been a dearth of safe and enjoyable bicycle-related amusement devices. Particularly, there have been no devices which combine a child's natural love of water pistols and squirt toys with the enjoyment of a bicycle.

Thus, it would be desirable to provide a device which would readily and economically permit a child to use a safe squirt toy on his or her bicycle. It is also desirable that this device encourage or require the use of a safety helmet when employed.

SUMMARY OF THE INVENTION

The present invention provides an amusement and safety device adapted to be mounted to a bicycle or similar velocipede which is of a rugged, simple construction for quick and easy attachment to the velocipede. The device includes a fluid reservoir which can be mounted to either the user or the velocipede itself. The device also includes a first conduit connected to the fluid reservoir and to a pump for conveying fluid from the fluid reservoir through the pump and on through a second conduit which terminates in a nozzle for dispersing the pumped fluid. The pump employed in this device is driven by the motion of the velocipede drive wheel. The nozzle end of the second conduit is attached to a helmet which is adapted to be worn by the rider of the velocipede.

Motion of the velocipede powers the pump and permits the delivery of water through the conduit and out the nozzle. The user can direct the stream of water by directing his or her head to the right, left or appropriate direction.

The device of the present invention is of an economical and light weight construction which can be easily attached and removed from the suitable velocipede.

BRIEF DESCRIPTION OF THE DRAWINGS

In the drawings, like reference numerals are used in the various drawings for like elements. The drawings include several figures a description of which follows

DESCRIPTION OF THE PREFERRED EMBODIMENT

Figure 1:
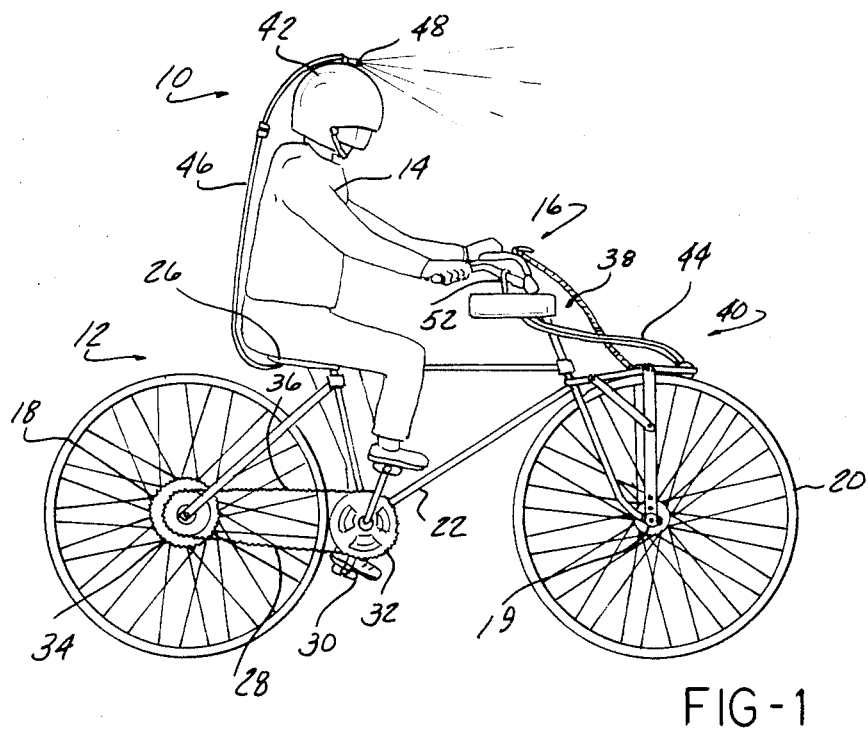
FIG. 1 is a side view of the device of the present invention mounted on a suitable velocipede.

Referring to the drawing, and in particular to FIG. 1, there is illustrated the safety/amusement device of the present invention generally designated by the reference numeral 10. The device is mounted to a bicycle 12 and to a rider 14. As is shown in FIG. 1, the bicycle 12 or other suitable velocipede include a handlebar 16, a drive wheel 18, a steering wheel 20 and a steering wheel axle 19. The bicycle 12 or similar velocipede will also include an appropriate support frame 22 and any desired number of additional auxiliary wheels (not shown). As shown in FIG. 1, the bicycle 12 also includes a suitable seat 26 for the rider 14 as well as a suitable vehicle drive mechanism 28. As shown in FIG. 1, this vehicle drive mechanism includes a set of pedals 30 and suitable drive sprockets and gears 32, 34 and a chain 36.

The device 10 of the present invention generally includes a fluid reservoir 38, a pump 40 and a helmet 42 with a first conduit 44 connecting the reservoir 38 to the pump 40 and a second conduit 46 attached to the pump 40 and terminating in a nozzle 48 attached to the helmet 42.

Figure 2:
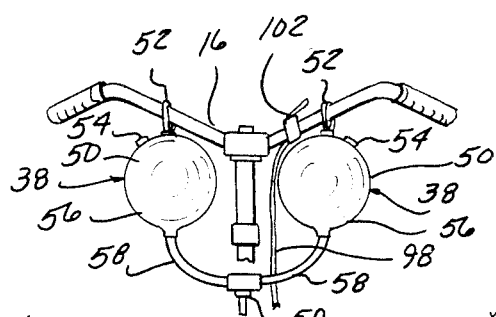
FIG. 2 is a detail drawing of the fluid reservoir portion of the present invention mounted on a representative handlebar of a suitable velocipede.
Figure 5:
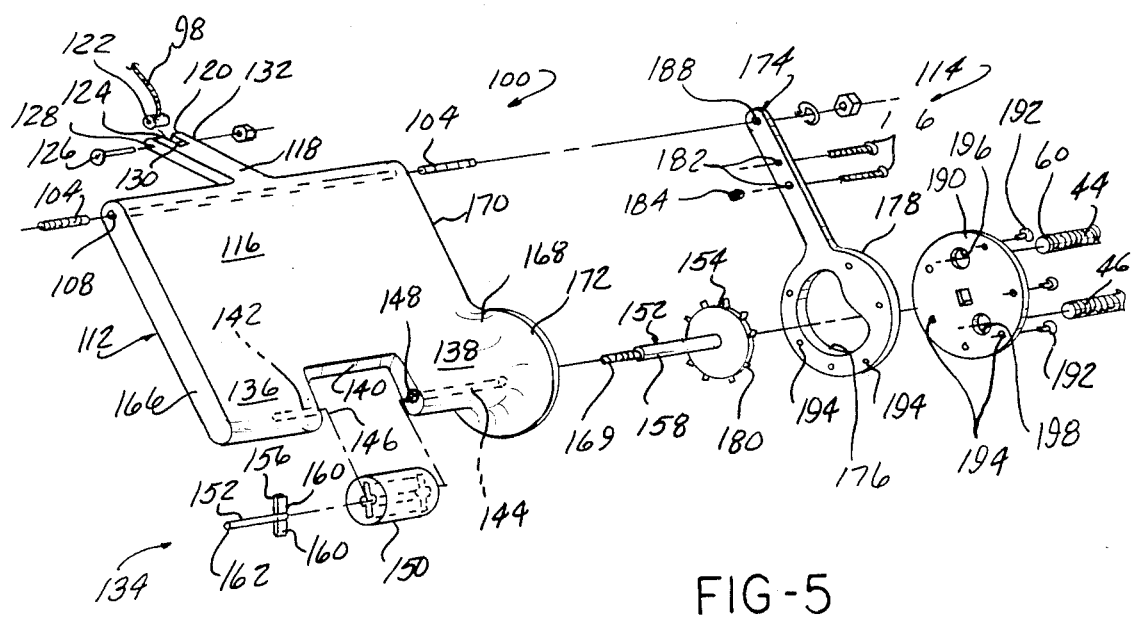
FIG. 5 is a detail exploded view of the pump and drive mechanism of the present invention.

The fluid reservoir 38 is, preferably, comprised of one or more fluid tanks 50. The fluid reservoir 38 may be mounted anywhere on the bicycle 12 or rider 14 which is convenient. In the embodiment shown in FIG. 2, two tanks 50 are suitably mounted to handlebars 16 by any appropriate means. Preferably, a suitable, releasable strap or tie 52 is used. Each tank 50 preferably has a filler cap 54 which is releasably attached to an opening (not shown) located proximate to the hanger 52. The filler cap 54 is suitably mated with the opening to insure that, once the tank 50 is filled, water or fluid is prevented from splashing back out. Generally, the filler cap 54 can have any suitable sealing means such as mating threaded surfaces or the like. Also located in the filler cap 54 or proximate thereto are suitable vent holes (not shown). The tank 50 also has an outlet area 56. The outlet area 56 is generally opposed to the filler cap 54. The outlet area 56 is, preferably, contiguously formed with the tank 50. The outlet area 56 can have a tapered area adjacent to the actual outlet (not shown). This tapered area permits the complete drainage of the tank 50. Attached to the tank 50 at the outlet area 56 are branch portions 58 of the first conduit 44. The branch portions 58 are connected to the respective tank 50 by any appropriate means and are connected to one another by a suitable union 59. Examples of suitable unions would be conventional T's, Y-shaped unions, etc. Downstream of the union 59, the first conduit 44 can be suitably fastened to the bicycle frame 22 until it terminates in a second or distal end 60 as shown in FIG. 5.

The distal end 60 of the first conduit 44 is joined to, and terminates at pump 40. In this manner, fluid from fluid reservoir 38 is conveyed through conduit 44 to the pump 40. In the preferred embodiment, the fluid reservoir 38 is positioned relatively higher than pump 40 to make use of gravity in conveying the fluid through the first conduit 44 to the pump 40.

The pump 40 is mounted to the bicycle 12 in a manner which will permit the operative portion thereof to be driven by contact with either the drive wheel 18 or the steering wheel 20 of the bicycle 12. In the embodiment as shown in FIG. 1, the pump 40 is mounted in any suitable manner to the front bracket of the bicycle 12. The preferred method of mounting is illustrated in detail in FIGS. 3 and 4.

Figure 3:
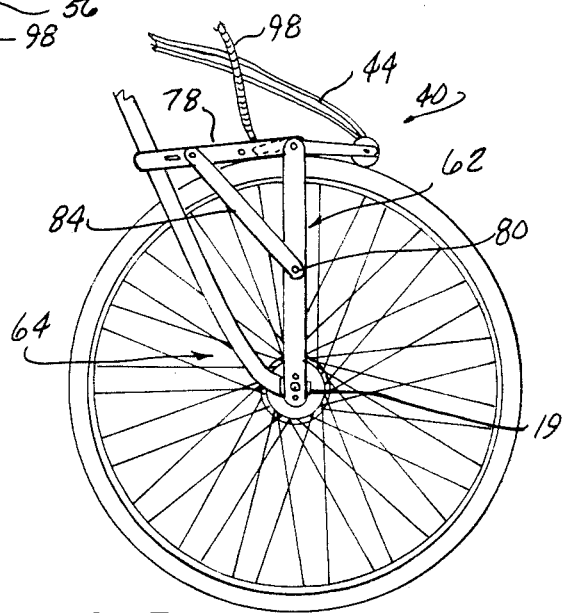
FIG. 3 is a detail drawing of the mounting bracket and pump assembly of the present invention shown in relation to the drive wheel of a representitive velocipdede.

The pump 40 is, preferably, attached by a mounting bracket 62 as shown in FIG. 3. In the preferred embodiment, the mounting bracket 62 and associated pump 40 are attached to the front or steering wheel 20. Both the front portion of the frame 22 (sometimes referred to as the steering fork) and the mounting bracket 62 are attached at one end to the steering wheel axle 19. A second end of the mounting bracket 62 is attached to a portion of the frame 22 adjacent to the upper end of the fork.

Figure 4:
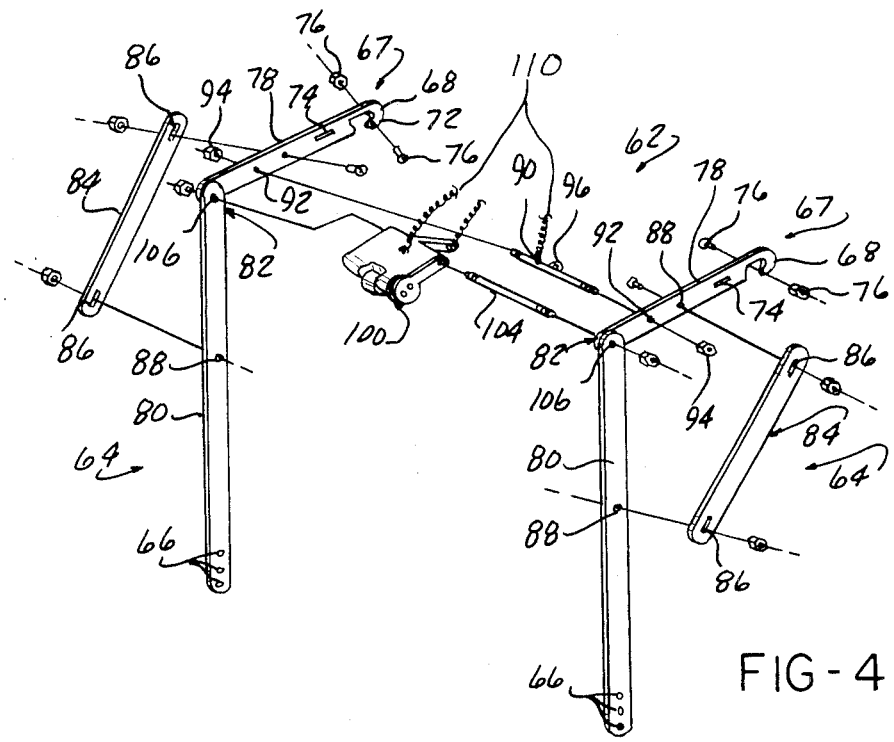
FIG. 4 is a detail exploded view of the mounting bracket and pump mounting assembly of the present invention.

The mounting bracket assembly 62 as shown in FIG. 4 is composed of two legs 64 which are adapted to be mounted on either side of the steering wheel 20. The legs are attached to the steering wheel at the steering axle 19. Ordinarily, this can be accomplished by the removal of fastening means from the axle 19 and insertion of the axle 19 through a suitable aperture 66 located in the associated leg 64. Each leg 64 has a plurality of such apertures 66 to permit fastening on a variety of different bicycles having differing wheel diameters.

Each leg 64 has a mounting hook or other suitable mounting means 67 located at the opposite end of the leg 64 from the plurality of apertures 66. This mounting hook 67 is composed of a curved element 68. At the terminal end of the curved element 68 has an aperture 72 adapted to be bent to overlay a corresponding slot 74. The curved element 68 is adapted to be fitted around the suitable forked member (not shown) in the frame member 22. The curved element 68 can then be fastened by securing a suitable fastener such as a bolt and nut assembly 76 through the slotted aperture 74 and the aperture 72 located in the terminal end of the curved element 68. In this manner, the mounting bracket assembly 62 can be secured to the bicycle 12 or other similar velocipede.

The legs 64 of the mounting bracket 62 are, preferably, movably angled to permit adaptation to various sized wheels and frame configurations. In the preferred embodiment, each leg 64 is composed of a first member 78 and a second member 80 which are pivotally attached to one another at a central joint 82 with suitable pivotal attachement means (not shown). The plurality of apertures 66 is, preferably, located on the second leg 80 at an end opposed to the central joint 82. The mounting hook 67 is located on the first member 78 at a position opposed to the central joint 82. The pivotability of the central joint 82 permits each leg 64 of the mounting bracket assembly to be oriented in an angular fashion which permits the pump 40 to intermittantly rest above the steering wheel 20 in a manner which will be discussed in detail subsequently.

In order to maintain and secure the angular orientation of first and second members 78, 80 relative to one another, any suitable securement means can be used. In the preferred embodiment, a stabilizing member 84 is employed. The stabilizing member 84 is fastened to the first member 78 at a point midway between the central joint 82 and the mounting hook 67. Similarly, the stabilizing member 84 is also fastened to the second member 80 at a point midway between the central joint 82 and the plurality of apertures 66. The stabilizing member 84 has at least two slotted openings 86 which are adapted to correspond to apertures 88 located in both the first member and second member, 78, 80. The stabilizing member 84 can be fastened using any conventional method such as bolts and nuts, rivets or the like. The slotted openings 86 permit the angle defined by first and second members 78, 80 to be adjusted depending upon the size or configuration of the bicycle 12 and steering wheel 20 employed.

The two legs 64 of the mounting bracket assembly 62 are joined to one another in any desired manner. In the preferred embodiment, there is a lateral shaft 90 which extends between and is fastened to the two legs 64. The lateral shaft 90 is, generally, fastened perpendicularly between the two legs 64 through apertures 92 located in the first member 78 of both legs 64. The lateral shaft 90 provides a third point of stabilization between the two legs 64 of the mounting bracket. The lateral shaft 90 is attached to the two legs 64 by any conventional means. In the embodiment shown in FIG. 4, the ends of the lateral shaft 90 are threaded to threadingly engage a suitable nut 94 or other fastening means.

The lateral shaft 90 can also have an eye or socket 96 which can serve to guide the control wire 98 attached to the pump mounting bracket 100. The control wire 98 extends from the pump mounting bracket 100 through the center of the eye 96 and is guided to a suitably mounted control lever 102 located within easy reach of the rider 14 preferably on handlebar 16. In the preferred embodiment, the control lever 102 is mounted to the handlebar 16 in a manner similar to a conventional bicycle hand brake. The control wire 98 can be sheathed in a suitable housing (not shown) and can function in a manner similar to a hand brake.

The pump mounting bracket 100 is pivotally mounted on a mounting axle 104 which extends and is fastened between the two legs 64. In the preferred embodiment, the mounting axle 104 is fastened to the legs 64 by extending through a suitable aperture 106 located in the central joint 82. The ends of the mounting axle 104 can be threaded to threadingly engage a suitable nut or other fastener after extension through the aperture 106. The pump mounting bracket 100, preferably, extends through an apertures 108 located in the bracket and is pivotal thereabout. The pump mounting bracket 100 also has a biasing means 110 which is attached at one end to the pump mounting bracket 100 and, at a second end, to the lateral shaft 90 (shown in FIG. 4). The biasing means 110 is, preferably, a coil spring. The biasing means 110 maintains the pump mounting bracket 100 in a position out of contact with the steering wheel 20. When the control wire 98 is pulled, the pump mounting bracket 100 is urged pivotally against the biasing force exerted by the biasing means 110 and is drawn into contact with the drive wheel.

The pump mounting bracket 100 is shown in detail in FIG. 5. The pump mounting bracket 100 is composed of a drive housing 112 and a pump portion 114. The drive housing 112 is generally composed of a body 116 and an arm member 118. The arm member 118 is angularly positioned with respect to the body 116 and is contiguously formed thereon. The arm member 118 has a mounting portion 120 located opposite the area in which the arm member 118 converge with the body 116. At the mounting portion 120, the control wire 98 is joined. In the embodiment shown in FIG. 5, the control wire has an eyelet 122 located at its terminal end. The eyelet is adapted to fit into a corresponding indentation 124 located in the mounting portion 120 of the arm member 18. The eyelet 122 is contained within the indentation 124 means of a conventional bolt and nut fastener 126 which extends through a through bore 128 located in extensions 130 and 132 or arm member 118. The extensions 130 and 132 serve to define the indentation 124.

The pump mounting bracket 100 is pivotally mounted on mounting axle 104 which extends through the throughbore 108. In this manner, movement of the control wire 98 causes the pump mounting bracket to rotate against the biasing force exerted by the biasing means 110 to bring the pump mounting bracket 100 into engagement with the steering wheel 20.

Located in the body 116 of the drive housing 112 opposed to the arm member 118 is a disengageable drive mechanism 134. The opposed edge of the body 116 has two extensions 136, 138 which define a drive wheel indentation 140. Located in the first extension 136 is a lateral bore 142 shown in phantom in FIG. 5 which extends partway through the first extension 136. Opposed to the lateral bore 142 in first extension 136 is a lateral throughbore 144 which extends through second extension 138 shown in phantom. These bores 142, 144 are adapted to house bearings 146, 148 respectively and shafts which will be described in greater detail subsequently.

The disengageable drive mechanism 134 includes the bearings 146 and 148 as well as a friction wheel 150 adapted to be contained within and extend from the drive wheel indentation 140. The friction wheel 150 of this embodiment is adapted to rotatingly contact the surface of the steering wheel 20. Rotation of the steering wheel 20 imparts rotation to the friction wheel 150. The friction wheel 150 is mounted on a suitable drive shaft/axle 152 which, in turn, is connected to an impeller 154. The drive shaft/axle 152 is rotated with the rotation of the friction wheel 150 thereby imparting rotational movement to the impeller 154.

In FIG. 5, the drive shaft/axle 152 is severable into a friction wheel-mounted portion 156 and an impeller portion 158. The friction wheel portion 156, preferably, include slats 160 which extend into an interior opening centrally located in friction wheel 150 mounted on a shaft portion 162 which extends through bearing 146 into lateral bore 142.

The impeller portion 158 of drive shaft/axle 152 has a threaded extension 164 which is adapted to be received within a mating aperture defined in shaft portion 162 (not shown). Extending outward on the impeller are a plurality of deflectable blades 180 whose function will be described in greater detail subsequently.

The drive housing 112, preferably, includes a first end portion 166 perpendicularly oriented to the throughbore 108 and a second end portion 168 parallel and opposed to the first end portion 166. The second end portion 168, preferably, has an elongated area 170 positioned proximate to the throughbore 108 and an enlarged circular portion 172 opposed to the elongated area adjacent to second extension 138.

The pump portion 114 is mounted to the second end portion 166.

The pump portion 114 of the pump mounting bracket 100 includes a plate 174 having an exterior configuration which corresponds to the configuration of the second end portion 168. The plate 174 has an enlarged portion 178 which corresponds to the enlarged circular portion 172 of the second end portion 168.

A cavity 176 is defined within the enlarged portion 178 of the plate 174. The cavity is generally a planar circular opening with a suitable concave extension. The impeller 154 is adapted to be contained within the cavity 176. Blades 180 located on the impeller are generally flexible so as to conform with the defined shape of the cavity 176. As the impeller 154 rotates various blades 180 are compressed as they contact the concave extension. Water contained within the spaces defined by the blades is forced out through a suitable outlet. As the various blades 180 are freed from their constriction, a slight vacuum is created which draws water into the cavity 176.

The plate 174 can also have appropriate mounting apertures 182 located in an elongated portion 184 through which appropriate fastening means such as screws 186 extend and contact the body 116. The elongated portion 184 of plate 174 also includes an aperture 188 which corresponds to the throughbore 108 through which mounting axle 104 extends. A suitable seal can also be placed between the surface of the second end portion 168 and the corresponding surface of the plate 174 to provide a water tight seal for the mechanism.

Closure of the cavity 176 is obtained by a closure plate 190 which is adapted to extend over the enlarged portion 178 of the plate 174. The closure plate 190 can be fastened to the plate 174 and the second end portion 168 by means of a series of screws 192 which extend through suitable apertures 194 in the closure plate 190 and intermediate plate 174 into the second end portion 168.

The closure plate 190 has a suitable inlet port 196 into which the first conduit 44 extends and an outlet port 198 into which the second conduit 46 is connected. The first and second conduits, 44 and 46 respectively are fastened to the inlet port 196 or outlet port 198 by conventional means. The inlet port 196 is positioned such that it opeens into the cavity 176 immediately after the indentation defined therein as determined by the rotation of the impeller 154. The outlet port 198 is located at a position immediately prior to the indentation defined in the cavity 176 as determined by the rotation of the impeller. Rotation of impeller 154 draws water in through the inlet port 196 and forces the water to be evacuated through the outlet port 198. In this manner, the pump, driven by the motion of the drive wheel 18 conveys water from the fluid reservoir 138 out through the second conduit 46.

Figure 6:
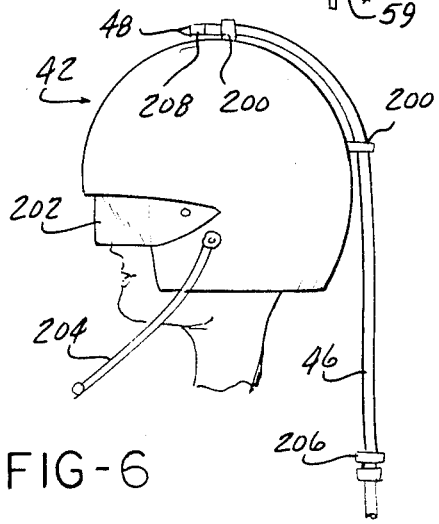
FIG. 6 is a detail, side view of a helmet and nozzle device of the present invention.

As shown in FIGS. 1 and 6, the water is conveyed through the second conduit 46 to the nozzle 48 which is mounted by suitable snap fittings or other mounting brackets to the surface of helmet 42. The helmet 42 can have any desired configuration. It is preferably that the helmet be impact resistent and have suitable impact-protective padding (not shown) on its interior to prevent head injuries to the user. The helmet can have a visor 202, a chin strap 204 and any decorative features which may be desired. Additionally, the conduit 46 can be equipped with a suitable breakaway coupling of any conventional design such as the coupling shown at reference numeral 206. Such a coupling would prevent the breakage of the second conduit 46 in the event that the rider falls from the bicycle.

The nozzle 48, the first conduit 44, and the second conduit 46 will have relative diameters suitable to deliver a steady, harmless stream of water. In general, the first and second conduits 44, 46 respectively will be made of a suitable polymeric tubing such as TYGON tubing or the like. The conduits 44, 46 will, preferably, have a diameter between about 1/16 inch and ½ inch. The nozzle will generally have a diametric opening of approximately 1/5 to ½ the diameter of the tubing. The nozzle orifice may be divided into a series of smaller orifices to deliver a more dispersed stream if desired. It is contemplated that the nozzle may be either integrally formed with the second conduit or may be attachable to a suitable screw fitting 208 placed on the second conduit 46.

When the device is used, the rider 12 engages the control lever 102 to bring the friction wheel 150 mounted on the pump mounting bracket 100 into rotational engagement with the moving steering wheel 20. This powers the impeller 154 located in the cavity 176. Rotation of the impeller 154 draws water through the first conduit 44 into the cavity 176. The water is expelled through the outlet 198 into the second conduit 46 and is forced upward through the conduit 146 and out through the nozzle 48. The user can direct the stream of water in any direction desired simply by moving his or her head to the right or left and aiming at the given object. In this manner, various water games can be played with bicycles using the device of the present invention. Additionally, the rider 14 is encouraged to develop the habit of wearing a safety helmet such as that depicted at 42 in FIGS. 1 and 6. Thus, a device which is both enjoyable and promotes bicycle safety has been disclosed.

Having thus disclosed this invention, what is claimed is:

1. An amusement device adapted to be mounted to a velocipede, said velocipede having at least one moving wheel with a central axle, said amusement device comprising:
   a fluid reservoir;
   a pump for conveying fluid from the reservoir, the pump being driven by said velocipede wheel;
   a first conduit connected to the fluid reservoir and the pump for conveying fluid from the fluid reservoir to the pump;
   a second conduit for conveying fluid away from the pump having a first end connected to the pump and a second end of the conduit distal to the first end;
   a nozzle attached to the second end of the conduit;
   a helmet adapted to be worn by a rider of the velocipede, the nozzle and second end of the second conduit mounted to the helmet; and
   means for controlling the flow of fluid through the nozzle comprising:
   a mounting bracket assembly having a first and a second leg, the bracket surrounding said velocipede wheel and attached to said central axle;
   a mounting axle mounted to the bracket extending between the first and second bracket legs;
   a pump mounting bracket pivotally mounted on the mounting axle perpendicular to the first and second legs of the mounting bracket assembly, the pump mounting bracket having a body in which the pump is mounted and an arm member contiguously joined to the body and opposed to the pump, being releasably engageable with said moving wheel of said velocipede; and
   means for biasingly urging the pump out of engagement with said moving wheel of said velocipede.

2. The device of claim 1 wherein the fluid reservoir is mounted on said bicycle in a position above the relative position of the pump.

3. The device of claim 2 wherein the fluid reservoir comprises at least one tank, the tank comprising:
   a hollow body;
   a filler opening;
   an outlet opposed to the filler opening, the first conduit connected thereto;
   a hanger attached to the hollow body and releasably attachable to said velocpiede.

4. The device of claim 3 wherein the tank is releasably attached to said handlebar of said velocipede.

5. The device of claim 1 wherein the helmet has an outer surface and includes at least one clasp located on the outer surface of the helmet adapted to releasably secure the second conduit thereto.

6. The device of claim 5 wherein the second conduit further comprises a releasable coupling member located in the conduit between the first end and the second end.

7. An amusement device adapted to be mounted to a velocipede, said velocipede having at least one moving wheel with a central axle, said amusement device comprising:
   a housing having an inlet port, an outlet port and a central cavity, the housing connected to a pump mounting bracket;
   means for securing the housing to the velocipede in releasable engagement with said moving wheel;
   a rotatable drive shaft positioned in the central cavity, the drive shaft extending beyond the housing through a shaft opening;
   an impeller mounted on the drive shaft and positioned within the cavity; and
   a friction wheel mounted on the drive shaft releasably engageable with said moving wheel of said velocipede;
   a fluid reservoir;
   a pump for conveying fluid from the reservoir, the pump being driven by said velocipede wheel;
   a first conduit connected to the fluid reservoir and the pump for conveying fluid from the first reservoir to the pump;
   a second conduit for conveying fluid away from the pump having a first end connected to the pump and a second end of the conduit distal to the first end;
   a nozzle attached to the second end of the conduit; and
   a helmet adapted to be worn by a rider of the velocipede, the nozzle and second end of the conduit mounted to the helmet.

8. The device of claim 7 wherein the first conduit is connected to the inlet port of the housing and the second conduit is connected to the outlet port.

9. An amusement device adapted to be mounted on a bicycle, said bicycle having at least one moving wheel with a central axle, and a handlebar, the amusement device comprising:
   a fluid reservoir;

a first conduit having a first end connected to the fluid reservoir for channelling fluid therefrom and a second end;

a pump releasably engageable with said moving wheel of said bicycle for conveying water from the fluid reservoir through the first conduit, the second end of the conduit connected thereto;

a mounting bracket assembly having a first leg and a second leg and a mounting axle extending perpendicularly there between, each leg having a mounting hook and an aperture opposed thereto, the aperture adapted to be fastened to said central axle of said moving wheel;

a pump mounting bracket pivotally positioned on the mounting axle perpendicular to the first and second bracket legs, the pump mounting bracket having a body to which the pump is attached, an angularly disposed arm and a centrally located aperture, the mounting axle extending through said aperture;

means for biasingly urging the pump out of engagement with said moving wheel of said bicycle;

a second conduit connected to the pump for conveying fluid away from the pump, the conduit having a first end attached to the pump and a second end distal thereto;

a nozzle attached to the second end of the conduit;

a helmet adapted to be worn by a rider of the bicycle, the nozzle and distal end of the second conduit releasably mounted thereto.

10. The device of claim 9 further comprises:

a stabilizing bar perpendicularly attached between the first and second bracket legs of the pump mounting bracket;

a control cable having a first end and a second end, the first end attached to the arm of the pump mounting bracket;

a control lever attached to said handlebar of said bicycle, the second end of the control cable attached to the control lever such that activation of the control lever works against the biasing means to urge the pump into engagement with said moving wheel.

11. The device of claim 10 wherein the fluid reservoir comprises at least one hollow tank having a filler cup, an outlet opposed to the filler cup, the first conduit connected to the outlet and a hanger attached to the hollow body proximate to the filler cap, the hanger releasably attachable to said handlebar.

12. The device of claim 9 wherein the pump comprises:

a housing having a central cavity, an inlet port to which the first conduit is connected and an outlet port to which the second conduit is connected in fluid communication with the central cavity and means for securing the housing to the bicycle, and a shaft opening;

a rotatable drive shaft having a first end extending through the shaft opening into the central cavity and a second end extending away from the shaft opening;

an impeller positioned within the central cavity and mounted on the drive shaft;

a friction wheel mounted proximate to the second end of the drive shaft and releasably engageable with said moving wheel of said bicycle.

* * * * *